US012341337B2

(12) United States Patent
Aharoni et al.

(10) Patent No.: US 12,341,337 B2
(45) Date of Patent: Jun. 24, 2025

(54) MULTI VOLTAGE-DOMAIN ELECTRO STATIC DISCHARGE (ESD) POWER CLAMP

(71) Applicant: TOWER SEMICONDUCTOR LTD., Migdal Haemek (IL)

(72) Inventors: Efraim Aharoni, Haifa (IL); Avi Parvin, Netania (IL); Roda Kanawati, Irvine, CA (US); Allon Parag, Ramat Yishai (IL); Einat Arad Ophir, Yuvalim (IL)

(73) Assignee: TOWER SEMICONDUCTOR LTD., Migdal Haemek (IL)

( * ) Notice: Subject to any disclaimer, the term of this patent is extended or adjusted under 35 U.S.C. 154(b) by 300 days.

(21) Appl. No.: 17/991,869

(22) Filed: Nov. 22, 2022

(65) Prior Publication Data

US 2024/0170958 A1     May 23, 2024

(51) Int. Cl.
  *H02H 9/00*     (2006.01)
  *H02H 9/04*     (2006.01)
(52) U.S. Cl.
  CPC .................... *H02H 9/046* (2013.01)
(58) Field of Classification Search
  None
  See application file for complete search history.

(56) References Cited

U.S. PATENT DOCUMENTS

| | | | | |
|---|---|---|---|---|
| 5,463,520 A * | 10/1995 | Nelson | ................... | H02H 9/046 361/56 |
| 5,610,791 A | 3/1997 | Voldman | | |
| 6,002,568 A * | 12/1999 | Ker | ................... | H10D 89/601 361/111 |
| 6,157,530 A * | 12/2000 | Pequignot | .............. | H10D 89/60 361/111 |
| 7,839,612 B1 * | 11/2010 | Chan | ................... | H10D 89/819 361/56 |
| 8,743,517 B2 * | 6/2014 | Tsai | ................... | H02H 9/046 361/111 |
| 2018/0006448 A1 * | 1/2018 | Glaser | ................... | H02H 9/046 |

OTHER PUBLICATIONS

ESD in Silicon Integrated Circuits, Ajith Amerasekera and Charvaka Duvvury, John Wiley and Sons, Ltd., 2nd edition, 2002, 421 pages.
ESD Design and Synthesis, Steven H. Voldman, John Wiley & Sons, Ltd., 2011, 284 pages.

* cited by examiner

*Primary Examiner* — Stephen W Jackson
(74) *Attorney, Agent, or Firm* — Shichrur & Co.

(57) ABSTRACT

For example, a multi voltage-domain Electro Static Discharge (ESD) power clamp may include a plurality of pins; and an ESD array including a cascaded plurality of ESD power clamps. For example, the ESD array may include a plurality of ESD array portions configured to protect a respective plurality of voltage domains from ESD. For example, the ESD array may be configured to connect the plurality of ESD array portions between a respective plurality of pin pairs from the plurality of pins. For example, an ESD array portion corresponding to a voltage domain may include one or more ESD power clamps of the cascaded plurality of ESD power clamps. For example, the ESD array portion may be configured to protect a voltage range of the voltage domain.

21 Claims, 7 Drawing Sheets

MULTI VOLTAGE-DOMAIN ELECTRO STATIC DISCHARGE (ESD) POWER CLAMP

TECHNICAL FIELD

Aspects described herein generally relate to a multi voltage-domain Electro Static Discharge (ESD) power clamp.

BACKGROUND

Electronic components of an Intergraded Circuit (IC) may be subject to Electro Static Discharge (ESD).

Some devices may implement a protection mechanism, e.g., an ESD power clamp, which may be configured to discharge ESD currents and/or to clamp excessive voltage from the electronic components, for example, in order to prevent damage to the electronic components of the IC.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
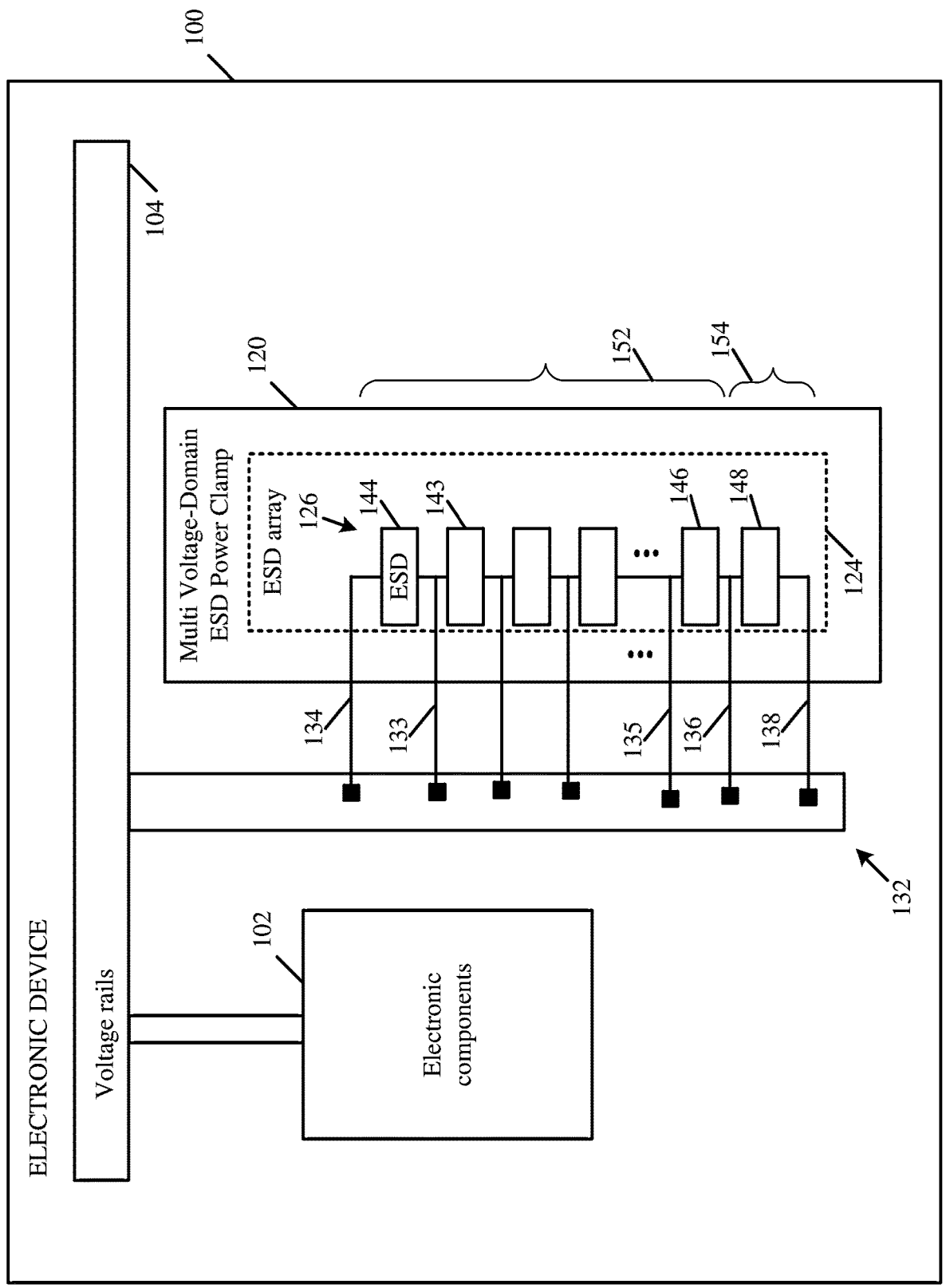
FIG. 1 is a schematic block diagram illustration of an electronic device, in accordance with some demonstrative aspects.

In the following detailed description, numerous specific details are set forth in order to provide a thorough understanding of some aspects. However, it will be understood by persons of ordinary skill in the art that some aspects may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of an electronic device, an electronic circuit, an electronic system, a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one aspect", "an aspect", "demonstrative aspect", "various aspects" etc., indicate that the aspect(s) so described may include a particular feature, structure, or characteristic, but not every aspect necessarily includes the particular feature, structure, or characteristic. Further, repeated use of the phrase "in one aspect" does not necessarily refer to the same aspect, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

The phrases "at least one" and "one or more" may be understood to include a numerical quantity greater than or equal to one, e.g., one, two, three, four, [ . . . ], etc. The phrase "at least one of" with regard to a group of elements may be used herein to mean at least one element from the group consisting of the elements. For example, the phrase "at least one of" with regard to a group of elements may be used herein to mean one of the listed elements, a plurality of one of the listed elements, a plurality of individual listed elements, or a plurality of a multiple of individual listed elements.

Some aspects may be used in conjunction with various devices and systems, for example, an electronic device, a computing device, an integrated computing device, an integrated chip, electronic circuitry, a processing device, an electronic device, a processor, a memory device, an imaging device, a digital camera device, a video device, a camera module, a medical imaging device, a mobile computer, a laptop computer, a notebook computer, a tablet computer, a handheld computer, a handheld device, a mobile or portable device, a consumer device, a Smartphone and the like.

The terms "substrate" and/or "wafer", as used herein, may relate to a thin slice of semiconductor material, for example, a silicon crystal or a Silicon on Insulator (SOI), which may be used in fabrication of integrated circuits and/or any other microelectronic devices. For example, the wafer may serve as the substrate for the microelectronic devices, which may be built in and over the wafer.

The term "Integrated Circuit" (IC), as used herein, may relate to a set of one or more electronic circuits on a semiconductor material. For example, an electronic circuit may include electronic components and their interconnectors.

Reference is made to FIG. 1, which schematically illustrates a block diagram of an electronic device 100, in accordance with some demonstrative aspects.

In some demonstrative aspects, electronic device 100 may include and/or may be implemented as an IC.

In some demonstrative aspects, electronic device 100 may include, or may be implemented as, a board level or any other electronic system.

In some demonstrative aspects, the IC may include a complementary metal oxide-semiconductor (CMOS) IC formed on a wafer.

In some demonstrative aspects, electronic device 100 may include a plurality of electronic components 102, for example, to operate the electronic device 100, and/or to perform one or more operations and/or functionalities of the electronic device 100.

In some demonstrative aspects, the plurality of electronic components 102 may require and/or may consume power corresponding to a plurality of voltage ranges in a plurality of voltage domains, e.g., as described below.

In some demonstrative aspects, the plurality of voltage domains may include a Very High Voltage (VHV) domain, e.g., having a voltage range of hundreds of Volts, and/or any other voltage.

In some demonstrative aspects, the plurality of voltage domains may include a Middle Voltage (MV) domain, e.g., having a voltage range of tens of Volts, and/or any other voltage, e.g., lower than the voltage of the VHV domain.

In some demonstrative aspects, the plurality of voltage domains may include a Low Voltage (LV) domain, e.g., having a voltage range of few Volts, and/or any other voltage, e.g., lower than the voltage of the MV domain.

In some demonstrative aspects, the plurality of voltage domains may include two or more different voltage domains of a same type, for example, two or more VHV domains, two or more MV domains, and/or two or more LV domains.

In one example, for some applications, such as VHV gate drivers, an IC may be configured to support one or more VHV domains, one or more intermediate/MV domains, and/or one or more LV domains. For example, the IC may be configured to utilize one or more level shifters, for example, to allow communication between the voltage domains of the IC elements.

In some demonstrative aspects, electronic device 102 may include a plurality of voltage rails 104 corresponding to the plurality of voltage domains, e.g., as described below.

In some demonstrative aspects, the plurality of voltage rails 104 may include voltage supply rails. For example, the plurality of voltage supply rails may be configured to supply power to the plurality of electronic components 102, for example, according to the plurality of voltage domains.

In some demonstrative aspects, the plurality of electronic components 102 may be connected to the plurality of voltage rails 104, for example, to consume power via the plurality of voltage rails 104.

In one example, voltage rails 104 may include one or more of first voltage rails corresponding to one or more VHV domains. For example, the first voltage rails may be configured to supply power to a first electronic component 102, which may consume voltage in a voltage range of the VHV domain.

In another example, voltage rails 104 may include one or more of second voltage rails corresponding to one or more MV domains. For example, the second voltage rails may be configured to supply power to a second electronic component 102, which may consume voltage in a voltage range of the MV domain.

In another example, voltage rails 104 may include one or more of third voltage rails corresponding to one or more LV domains. For example, the third voltage rails may be configured to supply power to a third electronic component 102, which may consume voltage in a voltage range of the LV domain.

In some demonstrative aspects, the plurality of voltage rails 104 may include Input/output (I/O) rails. For example, the plurality of I/O rails may be configured to provide inputs to, or outputs from, electronic components 102, for example, according to the plurality of voltage domains.

In other aspects, the plurality of voltage rails 104 may include any other additional or alternative type of rails.

In some demonstrative aspects, there may be a need to provide a technical solution to protect electronic components of an IC, e.g., electronic components 102, from Electro Static Discharge (ESD) over plurality of voltage domains.

Figure 2:
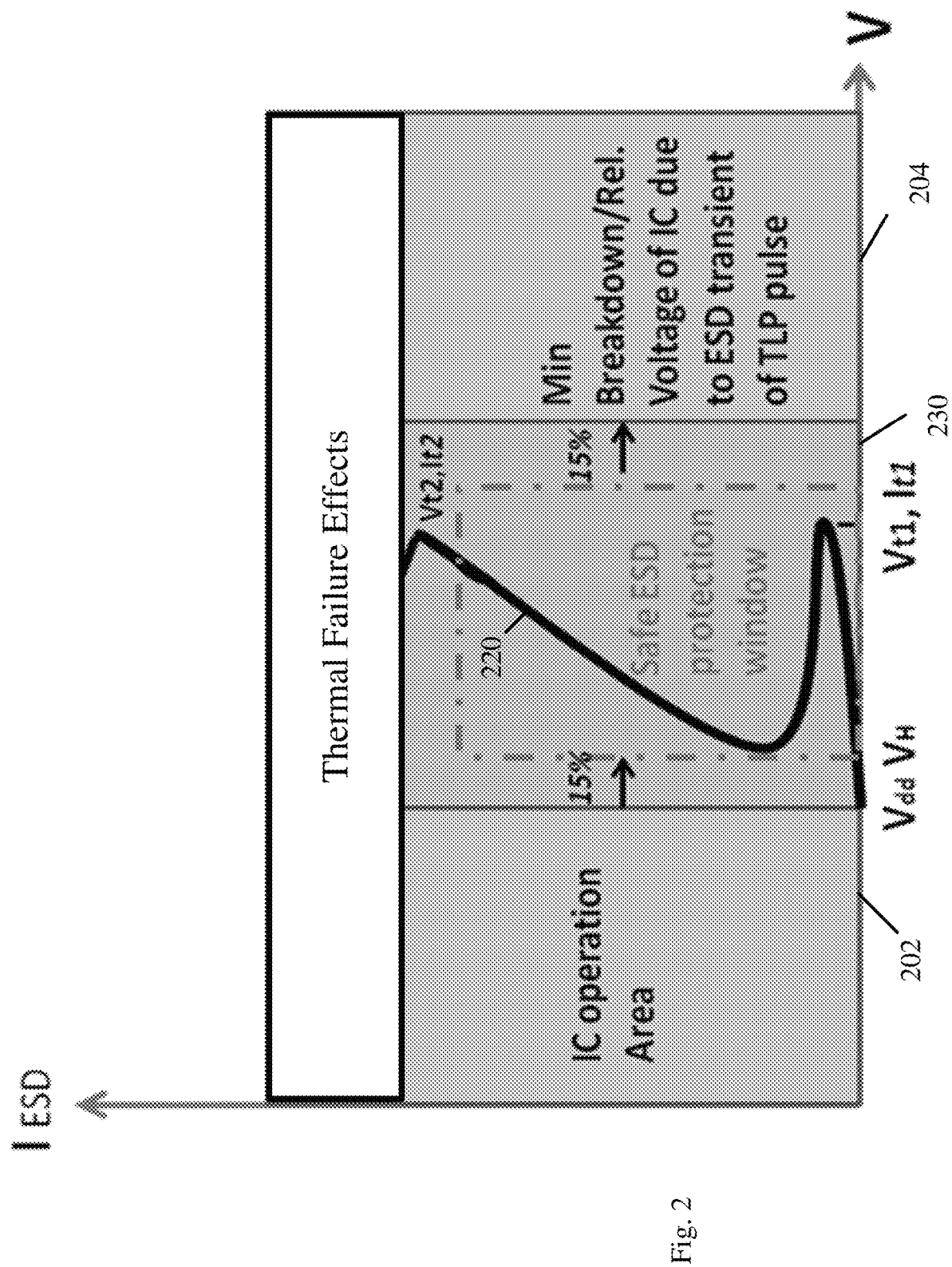
FIG. 2 is a schematic illustration of an Electro Static Discharge (ESD) protection design window, which may be implemented in accordance with some demonstrative aspects.

Reference is made to FIG. 2, which schematically illustrates an ESD protection design window 230, which may be implemented in accordance with some demonstrative aspects.

For example, an ESD power clamp may be configured to obey the ESD protection window 230, for example, with respect to electronic components connected between ESD rails.

As shown in FIG. 2, an electronic device, e.g., an IC, may operate in a normal operation window 202.

As shown in FIG. 2, one or more electronic components of the electronic device, e.g., an electronic component 102 (FIG. 1), may be damaged, for example, if ESD currents are not discharged by the ESD power clamp, for example, responsive to voltage drop during an ESD event.

As shown in FIG. 2, the electronic component may be damaged, for example, if the ESD power clamp does not discharge ESD currents, and/or clamp ESD voltage, which may damage the core devices by crossing into the core damage window 204.

As shown in FIG. 2, an ESD power clamp may be configured to protect the electronic component, for example, by discharging the ESD currents within the ESD protection design window 230.

As shown in FIG. 2, the ESD power clamp may be configured to protect the electronic component, for example, by configuring the ESD power clamp to have a triggering voltage, denoted Vt1, which is within ESD protection window 230. For example, ESD power clamp may protect the electronic component, for example, by preventing its current-voltage curve 220 from crossing the core damage window 204.

In some demonstrative aspects, there may be one or more technical inefficiencies, disadvantages and/or problems in techniques ("domain-dedicated ESD techniques") utilizing a dedicated ESD device to separately protect each voltage domain.

In one example, an IC may be configured according to a domain-dedicated ESD technique may include a plurality of dedicated ESD devices, e.g., a dedicated ESD device between each supply pin in each power domain and between a common ground pin.

In another example, an IC may be configured according to a domain-dedicated ESD technique for an implementation where there is a different ground pin for each voltage domain. For example, a dedicated ESD device configured for a particular voltage difference may be situated between a supply pin in each voltage domain and the ground pin of the same voltage domain. According to this example, a dedicated ESD clamp, e.g., including two anti-parallel ESD diodes, may be placed between different ground pins, for example, only if both ground pins have the same potential in normal operation. For example, if the ground pins have different potentials in normal operation, then an additional dedicated ESD power clamp may be added between local or relative 'ground' rails.

In another example, an IC may be configured according to a domain-dedicated ESD technique for an implementation where there is floating MV circuitry between two VHV pins.

For example, an additional dedicated MV ESD power clamp may be implemented to connect between these two VHV pins.

In another example, an IC may be configured according to a domain-dedicated ESD technique for an implementation with MV supply rails, e.g., in MV power domains. For example, these MV supply rails may require additional ESD power clamps for their local ground rails, e.g., absolute or floating.

In some demonstrative aspects, the domain-dedicated ESD techniques may be inefficient, area consuming, difficult to implement, complex and/or may suffer from additional or alternative technical problems.

For example, the domain-dedicated ESD techniques may utilize long ESD paths in ESD rails, which may cause high voltage drop, e.g., along the ESD rails, and/or a reduced ESD design window.

For example, as the dedicated VHV ESD power clamps may be based on chains of MV ESD devices, the need of placing a separate, dedicated, ESD power clamp between each VHV pin and Ground may result in a significant waste of IC area and related cost. This wasted IC area may be enhanced by the need to isolate each MV ESD device in the chain from the substrate, for example, to prevent voltage breakdown to the substrate.

In one example, an IC may support an LV domain, e.g., 5V; two MV domains, e.g., a Low Side 20V domain and a High Side 20V domain; and two VHV pins, e.g., a 160V pin and a 180V pin. Configuring the IC according to the domain-dedicated ESD techniques may require a dedicated VHV ESD power clamp between the 160V and a supply voltage (VSS), a dedicated VHV ESD power clamp between the 180V pin and the voltage VSS, a dedicated MV ESD power clamp between the 20V pin and the voltage VSS, a dedicated LV ESD power clamp between the 5V pin and VSS, and a dedicated floating MV ESD power clamp between the 180V pin and the 160V pin. In addition, in case of an implementation including a repetition of the voltage domains, e.g., the MV domain, and/or the VHV domain, one or more additional dedicated ESD power clamps, e.g., configured for each repetition, should be added. According to this example, implementation of the IC may require using a large number of ESD devices, which may consume significant IC area.

In some demonstrative aspects, there may be one or more technical inefficiencies, disadvantages and/or problems in techniques ("domain-dedicated ESD chain techniques") implementing a separate, dedicated, chain of ESD power clamps for each voltage domain of a plurality voltage domains. For example, an IC may be configured according to a domain-dedicated ESD chain technique for an implementation of multiple VHV and MV pins. For example, different dedicated ESD power clamp chains may be placed between each supply rail and ground pin.

In one example, a domain-dedicated chain of ESD power clamps may include a plurality of equal ESD power clamps.

In one example, a VHV ESD power clamp chain may be based on a plurality of MV ESD devices. For example, a VHV chain of ESD power clamps may include a plurality of equal MV ESD power clamps.

In one example, a first domain-dedicated VHV chain of ESD power clamps may include a chain of 4 equal MV ESD power clamps, e.g., for a range of 160V; and/or a second domain-dedicated VHV chain of ESD power clamps may include a chain of 5 equal MV ESD power clamps, e.g., for a range of 180V.

In one example, a large number of domain-dedicated ESD chains may be required for an IC configured to support the LV domain, e.g., 5V; two MV domains, e.g., the Low Side 20V domain and the High Side 20V domain; and two VHV pins, e.g., the 160V supply pin and the 180V supply pin. For example, the IC may require a first dedicated chain of MV ESD power clamps, which may include 4 SCR devices, between the 160V pin and the voltage VSS, a second dedicated chain of MV ESD power clamps, which may include 5 SCR devices, between the 180V pin and the voltage VSS, and two or more additional dedicated MV power clamps for the MV domains, e.g., between a 20V rail and the voltage VSS (ground) in the low side MV domain and between the 180V and 160V in the high side MV domain. This configuration may result in a big amount of ESD power clamps and/or significant waist of IC area.

In addition, there may be a need to isolate each MV ESD device in a domain-dedicated chain of MV ESD devices from a substrate, for example, to prevent voltage breakdown to the substrate. This may result in a further increase in the wasted IC area.

Referring back to FIG. 1, in some demonstrative aspects, electronic device 100 may include a multi voltage-domain ESD power clamp 120, which may be configured to protect the plurality of electronic components 102 from ESD over the plurality of voltage domains, e.g., as described below.

In some demonstrative aspects, multi voltage-domain ESD power clamp 120 may be triggered, for example, by an ESD event, to shunt or conduct an ESD current conductance, e.g., during a time sufficient to discharge an ESD current through a low impedance path.

In some demonstrative aspects, multi voltage-domain ESD power clamp 120 may be configured to discharge the ESD currents from electronic components 102 and/or to prevent exposure of electronic components 102 to excessive voltages, for example, to prevent damage to the electronic components 102, e.g., as described below.

In some demonstrative aspects, multi voltage-domain ESD power clamp 120 may be implemented to provide a technical solution to support ESD protection, for example, for a plurality of paths, e.g., for some or even all possible paths, between external pins of the electronic components 102, e.g., within the various voltage domains, and/or polarities, in which current can flow during the ESD event, e.g., as described below.

In some demonstrative aspects, multi voltage-domain ESD power clamp 120 may be configured to support ESD protection for a plurality of voltage ratings, which may match voltage ranges of the plurality of voltage rails 104, for example, considering both normal operation conditions and protection of the electronic components 102, e.g., during the ESD event.

In some demonstrative aspects, multi voltage-domain ESD power clamp 120 may be implemented to support an 'ESD Protection Design Window', e.g., as described above with reference to FIG. 2.

In some demonstrative aspects, multi voltage-domain ESD power clamp 120 may be implemented to provide a technical solution to support a reduced IC area, for example, by sharing various portions of multi voltage-domain ESD power clamp 120 for protection of multiple voltage domain, e.g., as described below.

In some demonstrative aspects, multi voltage-domain ESD power clamp 120 may include a power clamp chain of a plurality of ESD power clamps, e.g., as described below.

In some demonstrative aspects, multi voltage-domain ESD power clamp 120 may include a single power clamp chain of a plurality of ESD power clamps, e.g., as described below.

In other aspects, multi voltage-domain ESD power clamp 120 may include two or more power clamp chains. For example, multi voltage-domain ESD power clamp 120 may include a first power clamp chain to protect a first plurality of voltage domains, and/or a second power clamp chain to protect a second plurality of voltage domains, and so on.

In some demonstrative aspects, multi voltage-domain ESD power clamp 120 may include a power clamp chain of a relatively high voltage, e.g., a VHV power clamp chain, which may be based on a concatenation of a chain of relatively lower voltage ESD devices, e.g., as described below.

In one example, the VHV power clamp chain may be based on a combination of LV and/or MV power clamps.

In some demonstrative aspects, the VHV power clamp chain may be configured to clamp between a variety of VHV, MV, and/or LV power pin pairs, e.g., as described below.

In some demonstrative aspects, multi voltage-domain ESD power clamp 120 may include a plurality of pins 132, e.g., as described below.

In some demonstrative aspects, a pin 132 may include a metal pin, a node, a metal node, a connector, a metal connector, a terminal, and/or the like.

In some demonstrative aspects, multi voltage-domain ESD power clamp 120 may include an ESD array 124 including a cascaded plurality of ESD power clamps 126, e.g., as described below.

In some demonstrative aspects, an ESD power clamp 126 (also referred to as an "ESD device") may include a Silicon Controlled Rectifier (SCR), a Gate grounded N type MOS (GGNMOS), a bipolar NPN transistor, and/or any other ESD device and/or element configured for ESD protection.

In some demonstrative aspects, the ESD array 124 may include a plurality of ESD array portions configured to protect a respective plurality of voltage domains from ESD, e.g., as described below.

In some demonstrative aspects, the ESD array 124 may be configured to connect the plurality of ESD array portions between a respective plurality of pin pairs from the plurality of pins 132, e.g., as described below.

In some demonstrative aspects, an ESD array portion corresponding to a voltage domain may include one or more ESD power clamps 126 of the cascaded plurality of ESD power clamps 126, e.g., as described below.

In some demonstrative aspects, the ESD array portion may be configured to protect a voltage range of the voltage domain, e.g., as described below.

In some demonstrative aspects, the plurality of voltage rails 104 corresponding to the plurality of voltage domains may be connected to the plurality of pin pairs, e.g., from the plurality of pins 132.

In some demonstrative aspects, the plurality of pins 132 may include a shared pin 136, which may be shared by a first pin pair and a second pin pair of the plurality of pin pairs, e.g., as described below.

In some demonstrative aspects, the shared pin 136 may include a Ground (GND) pin 136, e.g., as described below.

In one example, the Ground pin 136 may be shared by a first pin pair, e.g., including ground pin 136 and a pin 133, and a second pin pair, e.g., including ground pin 136 and pin 134.

In some demonstrative aspects, the plurality of pins 132 may include a first pin pair and a second pin pair. For example, the first pin pair may include a first pin and a second pin of the plurality of pins 132, and the second pin pair may include a third pin and a fourth pin of the plurality of pins 132, e.g., as described below.

In some demonstrative aspects, the first, second, third and fourth pins may be separate pins of the plurality of pins 132, e.g., as described below.

In one example, the first pin pair may include pin 134 and pin 133, and/or the second pin pair may include pin 136 and pin 135.

In some demonstrative aspects, the ESD array 124 may include at least one shared ESD power clamp 146, which may be shared by a first ESD array portion and a second ESD array portion of the plurality of ESD array portions, e.g., as described below.

In one example, shared ESD power clamp 146 may be shared, for example, by a first ESD array portion including ESD power clamps between pin 136 and pin 135, and a second ESD array portion including ESD power clamps between pin 136 and pin 133.

In some demonstrative aspects, the ESD array 124 may include a first ESD array portion including one or more first ESD power clamps of the cascaded plurality of ESD power clamps 126, and a second ESD array portion including one or more second ESD power clamps of the cascaded plurality of ESD power clamps, e.g., as described below.

In some demonstrative aspects, each of the one or more second ESD power clamps may not be included in the one or more first ESD power clamps, e.g., as described below.

In one example, the ESD array 124 may include a first ESD array portion including one or more ESD power clamps between pin 136 and pin 135, and a second ESD array portion including one or more ESD power clamps between pin 133 and pin 134.

In some demonstrative aspects, the ESD array 124 may include a first ESD array portion including one or more first ESD power clamps of the cascaded plurality of ESD power clamps 126, and a second ESD array portion including the one or more first ESD power clamps of the first ESD array portion and one or more second ESD power clamps, which are not in the first ESD array portion, e.g., as described below.

In one example, the ESD array 124 may include a first ESD array portion including one or more ESD power clamps between pin 136 and pin 135, and a second ESD array portion including the one or more ESD power clamps between pin 136 and pin 135, and one or more ESD power clamps between pin 135 and pin 134, which are not in the first ESD array portion. For example, the second ESD array portion may include ESD power clamps between pin 136 and pin 134.

In some demonstrative aspects, the ESD array 124 may include a first ESD array portion configured to protect a first voltage domain and a second ESD array portion configured to protect a second voltage domain, e.g., as described below.

In some demonstrative aspects, the first ESD array portion may be different from the second ESD array portion, and a voltage range of the first voltage domain may be different from a voltage range of the second voltage domain, e.g., as described below.

In some demonstrative aspects, the ESD array 124 may be configured to connect a first ESD array portion between pins of a first pin pair to protect a first voltage domain from ESD, and to connect a second ESD array portion between pins of a second pin pair to protect a second voltage domain from ESD, e.g., as described below.

In some demonstrative aspects, the first voltage domain may have a first voltage range, and the second voltage domain may have a second voltage range, which may be, for example, wider than the first voltage range, e.g., as described below.

In some demonstrative aspects, the first ESD array portion may include a first count of ESD power clamps 126, and the second ESD array portion may include a second count of ESD power clamps 126, e.g., as described below.

In some demonstrative aspects, the second count of ESD power clamps may be greater than the first count ESD power clamps, e.g., as described below.

In some demonstrative aspects, the first voltage domain may include the MV domain or the LV domain, and/or the second voltage domain may include the VHV domain, e.g., as described below.

In one example, the ESD array 124 may be configured to connect a first ESD array portion, e.g., between pin 136 and pin 135, to protect a voltage range of the MV domain or the LV domain from ESD, e.g., as described below.

In one example, the ESD array 124 may be configured to connect a second ESD array portion, e.g., between pin 136 and pin 134, to protect a voltage domain of the VHV. For example, the count of ESD power clamps between pin 136 and pin 134 may be greater than the count of ESD power clamps between pin 136 and pin 135.

In some demonstrative aspects, the first voltage domain may include a first VHV domain having a first voltage range, and the second voltage domain may include a second VHV domain having a second voltage range, e.g., as described below.

In one example, the ESD array 124 may be configured to connect a first ESD array portion, e.g., between pin 136 and pin 133, to protect a first VHV voltage range, and/or to connect a second ESD array portion, e.g., between pin 136 and pin 134 to protect a second VHV voltage range, which is wider than the first VHV voltage range. For example, the count of ESD power clamps between pin 136 and pin 134 may be greater than the count of ESD power clamps between pin 136 and pin 133.

In some demonstrative aspects, the cascaded plurality of ESD power clamps 126 may include a plurality of identical ESD power clamps, e.g., as described below.

In some demonstrative aspects, the cascaded plurality of ESD power clamps 126 may include a plurality of ESD power clamps having a same setting of a scaling parameter, e.g., as described below.

In some demonstrative aspects, the scaling parameter may include a setting of one or more physical dimensions of the plurality of ESD power clamps, e.g., as described below.

In some demonstrative aspects, the setting of the one or more physical dimensions of the plurality of ESD power clamps may affect a voltage breakdown level of the plurality of ESD power clamps, a voltage breakdown level, a triggering voltage (Vt1) of the plurality of ESD power clamps, a holding voltage of the plurality of ESD power clamps, a current capability of the plurality of ESD power clamps and/or any other parameter or attribute of the plurality of ESD power clamps.

In other aspects, any other additional or alternative scaling parameter may be implemented.

In some demonstrative aspects, the cascaded plurality of ESD power clamps 126 may include one or more first ESD power clamps having a first setting of a scaling parameter, and one or more second ESD power clamps having a second setting of the scaling parameter, for example, different from the second setting of the scaling parameter. According to this example, the first setting of the scaling parameter may result in a first voltage breakdown level for the first ESD power clamps, and/or the second setting of the scaling parameter may result in a second voltage breakdown level, e.g., different from the first voltage level, for the second ESD power clamps, e.g., as described below.

For example, an ESD power clamp 144 may have a first voltage breakdown level, and an ESD power clamp 143 may have a second voltage breakdown level, for example, different from the first voltage breakdown level. In one example, the voltage breakdown level of ESD power clamp 143 may be higher than the voltage breakdown level of ESD power clamp 144.

In some demonstrative aspects, the ESD array 124 may include a negative-voltage ESD array portion 154, for example, to protect a negative-voltage domain, e.g., as described below.

In one example, the negative-voltage ESD array portion 154 may be realized by an ESD clamp device, which may be situated in an opposite polarity, e.g., as described below.

In some demonstrative aspects, the ESD array 124 may be configured to connect the negative-voltage ESD array portion 154 between a pin pair including Ground pin 136 and a negative-voltage pin 138.

In some demonstrative aspects, the ESD array 124 may include the negative-voltage ESD array portion 154 and a positive-voltage ESD array portion 152, e.g., as described below.

In some demonstrative aspects, the positive-voltage ESD array portion 152 may be configured to protect a positive-voltage range of a positive-voltage domain, and/or the negative-voltage ESD array portion 154 may be configured to protect a negative-voltage range of the negative-voltage domain, e.g., as described below.

In some demonstrative aspects, the positive-voltage ESD array portion 152 may include one or more first ESD power clamps connected in a first direction in the cascaded plurality of ESD power clamps 126, e.g., as described below.

In some demonstrative aspects, the negative-voltage ESD array portion 154 may include one or more second ESD power clamps connected in a second direction in the cascaded plurality of ESD power clamps 126, e.g., as described below.

In some demonstrative aspects, the first direction may be opposite to the second direction, e.g., as described below.

In one example, ESD power clamps between Ground pin 136 and pin 134, e.g., ESD power clamps 143, 144, and/or 146, may be connected in a first direction in the cascaded plurality of ESD power clamps 126, and/or ESD power clamps between Ground pin 136 and negative pin 138, e.g., power clamp 148, may be connected in a second direction, opposite the first direction, in the cascaded plurality of ESD power clamps 126.

In some demonstrative aspects, as shown in FIG. 1, multi voltage-domain ESD power clamp 120 may include a single chain of ESD devices 126, for example, for protecting a plurality of combinations of voltage domains, e.g., supplied by voltage rails 104.

In some demonstrative aspects, the plurality of combinations of voltage domains may include one or more MV pins, one or more VHV pins, and/or one or more LV pins, e.g., as described below.

In some demonstrative aspects, as shown in FIG. 1, the chain of ESD devices 126 may be shared by the plurality of pin pairs, for example, in such a way, which may allow protecting and clamping a variety of voltage pin combinations, e.g., as described below.

In some demonstrative aspects, as shown in FIG. 1, different portions of ESD array 124 may be realized to use different combinations of one or more ESD devices 126 from the chain of ESD devices 126 to protect various voltage rails 104, e.g., as described below.

In some demonstrative aspects, as shown in FIG. 1, multi voltage-domain ESD power clamp 120 may be implemented to provide a technical solution utilizing even only one chain of ESD devices 126, which may be shared as an ESD power clamp for a multi-voltage domain circuit, e.g., in electronic device 100. For example, different portions of ESD array 124 may be used to clamp between various voltage rail combinations, e.g., as described below.

In other aspects, multi voltage-domain ESD power clamp 120 may include two or more chains of ESD devices 126, which may provide ESD protection for two or more respective groups of voltage domains.

In some demonstrative aspects, multi voltage-domain ESD power clamp 120 may be implemented to provide a technical solution to save area of the multi voltage-domain ESD power clamp 120, for example, by sharing portions of ESD array 124, which may be used as ESD power clamps between different voltage rails 104.

In one example, the area reduction of the multi voltage-domain ESD power clamp 120 may be more pronounced, for example, in non-SOI flows, for example, as each of the ESD devices 126 may have a different floating voltage, for example, because of a lateral isolation size, e.g., as in very high voltage bulk applications.

Figure 3:
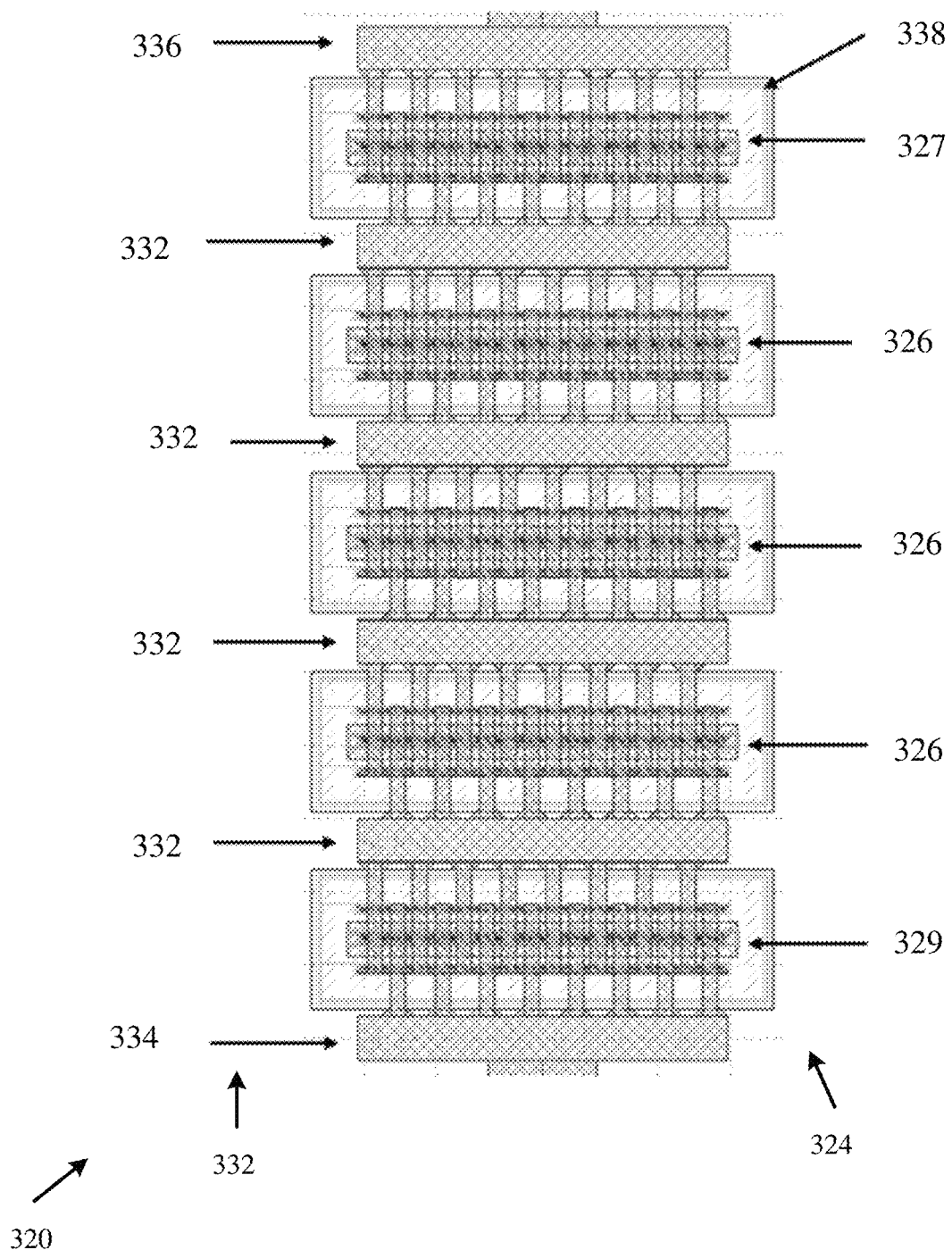
FIG. 3 is a schematic layout illustration of a multi voltage-domain ESD power clamp, in accordance with some demonstrative aspects.

Reference is made to FIG. 3, which schematically illustrates a layout of a multi voltage-domain ESD power clamp 320, in accordance with some demonstrative aspects. For example, multi voltage-domain ESD power clamp 120 (FIG. 1) may include one or more elements of multi voltage-domain ESD power clamp 320, and/or may perform one or more operations and/or functionalities of multi voltage-domain ESD power clamp 320.

In some demonstrative aspects, multi voltage-domain ESD power clamp 320 may be implemented as a VHV clamp, for example, while supporting ESD protection for a plurality of different voltage domains, e.g., as described below.

In some demonstrative aspects, as shown in FIG. 3, multi voltage-domain ESD power clamp 320 may include an ESD array 324 including a cascaded plurality of ESD power clamps 326, e.g., as described below.

In some demonstrative aspects, the cascaded plurality of ESD power clamps 326 may include a plurality of compact cascaded MV SCR devices.

In other aspects, multi voltage-domain ESD power clamp 320 may include any other additional or alternative type of ESD devices.

In some demonstrative aspects, an ESD power clamp 326, e.g., each ESD power clamp 326, may include an MV SCR.

In other aspects, an ESD power clamp 326, e.g., each ESD power clamp 326, may include any other ESD device. For example, ESD power clamp 326 may include a bipolar NPN, GGNMOS, and/or the like.

In some demonstrative aspects, as shown in FIG. 3, multi voltage-domain ESD power clamp 320 may include metal nodes 332, which may be connected, for example, between the cascaded plurality of ESD power clamps 326.

In some demonstrative aspects, the plurality of ESD power clamp 326 may be configured to clamp between VHV pin pairs and/or between additional pin pairs with VHV or MV voltage ranges.

In some demonstrative aspects, multi voltage-domain ESD power clamp 320 may be configured to protect a plurality of voltage-domains from ESD, for example, by connecting different pin pairs to different pairs of metal nodes 332.

In some demonstrative aspects, as shown in FIG. 3, multi voltage-domain ESD power clamp 320 may be configured to support sharing various portions of ESD array 324, for example, to clamp between a variety of pin pairs with different voltage ranges, e.g., in normal operation of an IC.

In some demonstrative aspects, as shown in FIG. 3, an ESD power clamp 326, e.g., each ESD power clamp 326, may be isolated from a common substrate.

In some demonstrative aspects, the isolation of the ESD power clamp 326 from the substrate may be realized, for example, by employing an SOI technology, e.g., as described below.

In some demonstrative aspects, the isolation of the ESD power clamp 326 from the substrate may be realized, for example, by a vertical isolation, for example, using buried oxide, e.g., underneath the ESD power clamp 326.

In some demonstrative aspects, the isolation of the ESD power clamp 326 from the substrate may be realized, for example, by a horizontal isolation, for example, by employing oxide in a deep trench 338, which may surround the ESD power clamp 326.

In other aspects, any other additional and/or alternative mechanism may be implemented, for example, to isolate the ESD power clamp 326 from the substrate.

In some demonstrative aspects, as shown in FIG. 3, an upper metal polygon 336, which is connected to an upper-most ESD power clamp 327, and/or a lower metal polygon 334, which is connected to a lower-most ESD power clamp 329, may support connection of a longest chain of ESD power clamps 326.

In some demonstrative aspects, the longest chain of ESD power clamps 326 may be utilized, for example, to clamp between VHV pins with a highest voltage range in an IC, e.g., in normal operation.

In some demonstrative aspects, intermediate metal nodes 332 may be connected between electrodes of the ESD power clamps 326 in the chain of ESD power clamps 326. For example, the intermediate metal nodes 332 may be used to clamp between pin pairs of voltage rails having voltage ranges lower than the highest voltage range in the IC, e.g., in the normal operation. For example, the intermediate metal nodes 332 may be used to clamp lower VHV ranges and/or MV voltage ranges, and/or any other voltage ranges.

Figure 4:
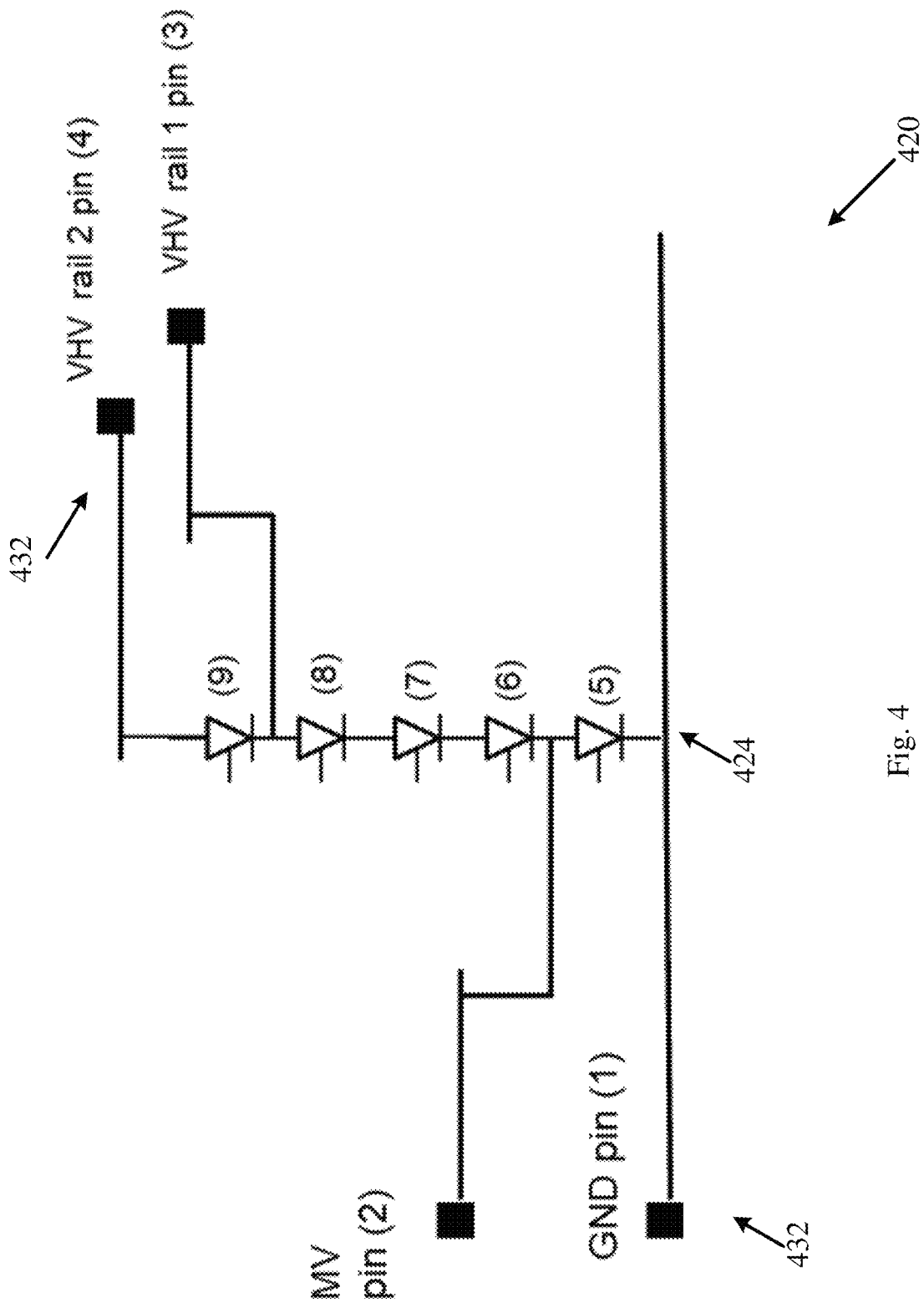
FIG. 4 is a schematic illustration of a multi voltage-domain ESD power clamp, in accordance with some demonstrative aspects.

Reference is made to FIG. 4, which schematically illustrates a multi voltage-domain ESD power clamp 420, in accordance with some demonstrative aspects. For example, multi voltage-domain ESD power clamp 120 (FIG. 1) may include one or more elements of multi voltage-domain ESD power clamp 420, and/or may perform one or more operations and/or functionalities of multi voltage-domain ESD power clamp 420.

In some demonstrative aspects, as shown in FIG. 4, multi voltage-domain ESD power clamp 420 may include a plurality of pins 432, denoted (1), (2), (3) and (4).

In some demonstrative aspects, as shown in FIG. 4, multi voltage-domain ESD power clamp 420 may include an ESD array 424 including a cascaded plurality of ESD power clamps, e.g., as described below.

In some demonstrative aspects, as shown in FIG. 4, multi voltage-domain ESD power clamp 420 may include a compact chain of ESD devices configured for ESD protection between various pairs of pins of the plurality of pins 432, e.g., in a multi voltage-domain circuit.

In some demonstrative aspects, as shown in FIG. 4, the cascaded plurality of ESD power clamps of ESD array 424 may include five MV ESD devices, denoted (5), (6), (7), (8), and (9).

In some demonstrative aspects, as shown in FIG. 4, a first portion of ESD array 424 may be configured to provide ESD power clamping between a highest VHV pin, denoted (4), e.g., a highest VHV rail, and a Ground (GND) pin, denoted (1).

In some demonstrative aspects, as shown in FIG. 4, the first portion of ESD array 424 may include the cascade of the five MV ESD devices (5), (6), (7), (8), and (9).

In some demonstrative aspects, as shown in FIG. 4, a second portion of ESD array 424 may be configured to provide ESD power clamping between a lower VHV pin, denoted (3), and the GND pin (1).

In some demonstrative aspects, as shown in FIG. 4, the second portion of ESD array 424 may include the cascade of the four MV ESD devices (5), (6), (7), and (8).

In some demonstrative aspects, as shown in FIG. 4, a third portion of ESD array 424 may be configured to provide ESD power clamping between an MV pin, denoted (2), and the GND pin (1).

In some demonstrative aspects, as shown in FIG. 4, the third portion of ESD array 424 may include the MV ESD device (5).

In some demonstrative aspects, as shown in FIG. 4, a fourth portion of ESD array 424 may be configured to provide ESD power clamping between the highest VHV pin (4), and the lower VHV pin (3).

In some demonstrative aspects, as shown in FIG. 4, the fourth portion of ESD array 424 may include MV ESD device (9).

In some demonstrative aspects, a portion of ESD array 424, e.g., each portion of ESD array 424, may be configured to provide ESD power clamping of two or more pin pairs having a same voltage difference.

In some demonstrative aspects, one or more additional or alternative portions of ESD array 424, e.g., including one or more MV ESD devices of the five MV ESD devices of ESD array 424, may be configured to provide ESD protection between one or more additional or alternative pins having a variety of voltage ranges, e.g., during a normal operation of the IC.

Figure 5:
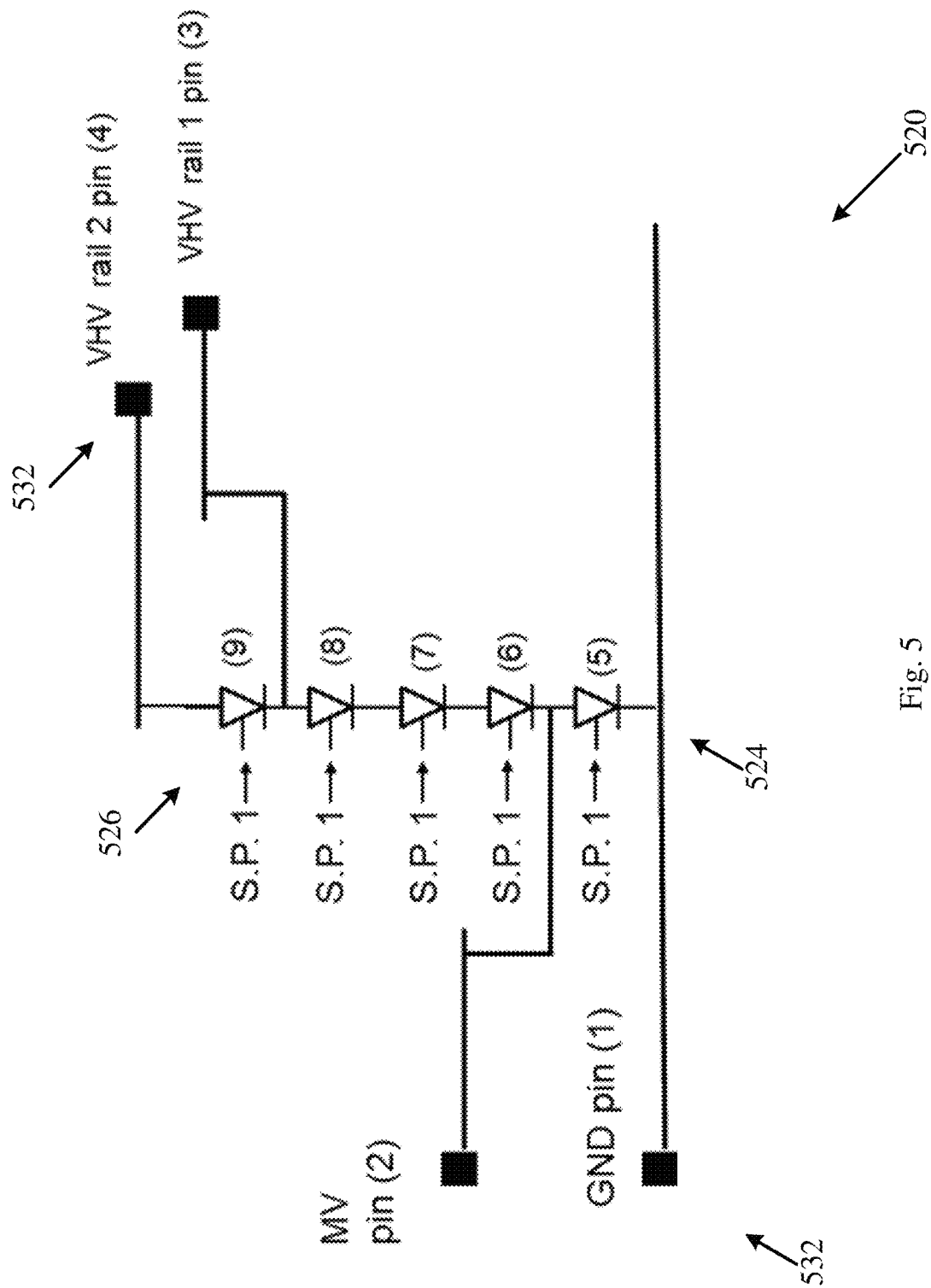
FIG. 5 is a schematic illustration of a multi voltage-domain ESD power clamp, in accordance with some demonstrative aspects.

Reference is made to FIG. 5, which schematically illustrates a multi voltage-domain ESD power clamp 520, in accordance with some demonstrative aspects. For example, multi voltage-domain ESD power clamp 120 (FIG. 1) may include one or more elements of multi voltage-domain ESD power clamp 520, and/or may perform one or more operations and/or functionalities of multi voltage-domain ESD power clamp 520.

In some demonstrative aspects, as shown in FIG. 5, multi voltage-domain ESD power clamp 520 may include a plurality of pins 532, denoted (1), (2), (3) and (4).

In some demonstrative aspects, as shown in FIG. 5, multi voltage-domain ESD power clamp 520 may include an ESD array 524 including a cascaded plurality of ESD power clamps 526, e.g., as described below.

In some demonstrative aspects, as shown in FIG. 5, multi voltage-domain ESD power clamp 520 may include a compact cascaded chain of ESD devices 526 configured for ESD protection between various pairs of pins of the plurality of pins 532, e.g., in a multi voltage-domain circuit.

In some demonstrative aspects, portions of the ESD array 524 may be configured to clamp a plurality of pin pairs with a variety of voltage differences, e.g., at normal operation.

In some demonstrative aspects, the voltage differences may include VHV ranges, MV ranges, and/or any other voltage difference ranges.

In some demonstrative aspects, as shown in FIG. 5, the cascaded plurality of ESD power clamps may include five MV ESD devices, denoted (5), (6), (7), (8), and (9).

In some demonstrative aspects, the cascaded chain of ESD devices 526 may include similar ESD devices, which may be configured to have similar, e.g., identical, attributes. For example, a cascaded chain of similar, e.g., identical, ESD devices 526 may be implemented to provide a technical solution to support sharing of a single ESD device, or a portion of the ESD array 524 including one or more ESD devices from the ESD array 524, between a plurality of pairs of pins 532, for example, for different voltage domains.

In some demonstrative aspects, as shown in FIG. 5, a plurality of ESD devices 526, e.g., each ESD device 526, of the ESD array 524 may have a same setting or value of a Scaling Parameter, denoted (SP).

In one example, the scaling parameter of an ESD device 526 may include a changeable layout dimension, which may control one or more scalable parameters of the ESD device 526. For example, the scalable parameters of the ESD device 526 may relate to an ESD design window, e.g., ESD protection design window 230 (FIG. 2). For example, the scalable parameters of the ESD device 526 may relate to a break down voltage, denoted Vbd, a triggering voltage, denoted Vt1, and/or any other additional and/or alternative parameters.

In some demonstrative aspects, the scaling parameter of an ESD device 526, e.g., each of the of an ESD devices 526, may be defined, for example, to support a maximum breakdown voltage and/or a maximum ESD triggering voltage, and/or ESD current capability.

In one example, the scaling parameter of an ESD device 526, e.g., each of ESD devices 526, may be defined, for example, to reduce a number of ESD cascaded devices 526 in the ESD array 524. For example, the scaling parameter of an ESD device 526, e.g., each one of ESD devices 526, may be defined, for example, to reduce, e.g., to minimum, the number of ESD cascaded devices 526 in the ESD array 524. For example, the scaling parameter of an ESD device 526, e.g., each one of ESD devices 526, may be defined, for example, to ensure a minimal number of chained ESD devices 526, and/or to reduce an IC area.

In some demonstrative aspects, as shown in FIG. 5, the scaling parameter of all of the ESD cascaded devices 526 may be similar, and may be configured with respect to a maximum possible value of the DC breakdown voltage Vbd, and/or a maximum possible value of the triggering voltage Vt1 of the ESD array 524, and/or current capability.

In some demonstrative aspects, as shown in FIG. 5, each of the five MV ESD devices (5), (6), (7), (8), and (9) may be configured to have the same scaling parameter setting, denoted S.P.1.

In some demonstrative aspects, a breakdown voltage value of the whole ESD array 524 may be based on a sum of the break down voltages of each one of the ESD devices (5), (6), (7), (8), and (9). For example, the breakdown voltage of the whole ESD array 524 may be based on a product of a breakdown voltage value of an ESD device (VBD1) multiplied by five, e.g., Vbd=(VBD1)*5.

In some demonstrative aspects, a triggering voltage value Vt1 of the whole cascade VHV ESD power clamp 520 may be based on a triggering voltage of the whole ESD array 524. For example, the triggering voltage Vt1 of the whole cascade VHV ESD power clamp 520 may be based on a product of a triggering voltage of an ESD device (Vt11) multiplied by five, e.g., Vt1=(Vt11)*5.

In some demonstrative aspects, the breakdown voltage value and/or the triggering voltage value may be configured for a first portion of ESD array 524 to provide ESD power clamping between a highest VHV rail, e.g., a highest VHV pin, denoted (4), and a GND pin, denoted (1).

In some demonstrative aspects, as shown in FIG. 5, the first portion of ESD array 524 may include the cascade of the five MV ESD devices (5), (6), (7), (8), and (9).

In some demonstrative aspects, as shown in FIG. 5, a second portion of ESD array 524 may be configured to provide ESD power clamping between a lower VHV pin, denoted (3), and the GND pin (1).

In some demonstrative aspects, as shown in FIG. 5, the second portion of ESD array 524 may include the cascade of the four MV ESD devices (5), (6), (7), and (8).

In some demonstrative aspects, a breakdown voltage of the second portion, e.g., in normal operation, may be based on the sum of the breakdown voltages of the four ESD devices. For example, the breakdown voltage of the second portion may be based on the product of a breakdown voltage value of an ESD device (VBD1) of the four ESD devices multiplied by four, e.g., Vbd=(VBD1)*4.

In some demonstrative aspects, a triggering voltage of the second portion, e.g., in normal operation, may be based on the product of triggering voltage of an ESD device (Vt11) multiplied by four, e.g., Vt1=(Vt11)*4.

In some demonstrative aspects, as shown in FIG. 5, a third portion of ESD array 524, including the MV ESD device (5), may be configured to support ESD power clamping between an MV pin, denoted (2), and the GND pin (1), for example, for clamping of MV voltage differences.

In some demonstrative aspects, as shown in FIG. 5, a fourth portion of ESD array 524, including the MV ESD device (9), may be configured to provide ESD power clamping between a highest VHV pin (4), and the lower VHV pin (3), for example, for clamping of MV voltage differences.

In some demonstrative aspects, using the same scaling factor for all ESD devices 526 may limit possible combinations of clamped pin pairs. For example, all the possible pin pairs, clamped by portions of the cascaded power clamps 526, may be based on the setting of the scaling parameter, e.g., equal to the setting of the scaling parameter or a product of the scaling parameter.

In some demonstrative aspects, a multi voltage-domain ESD power clamp may include a plurality of ESD devices having different settings of the scaling parameter, e.g., as described below.

Figure 6:
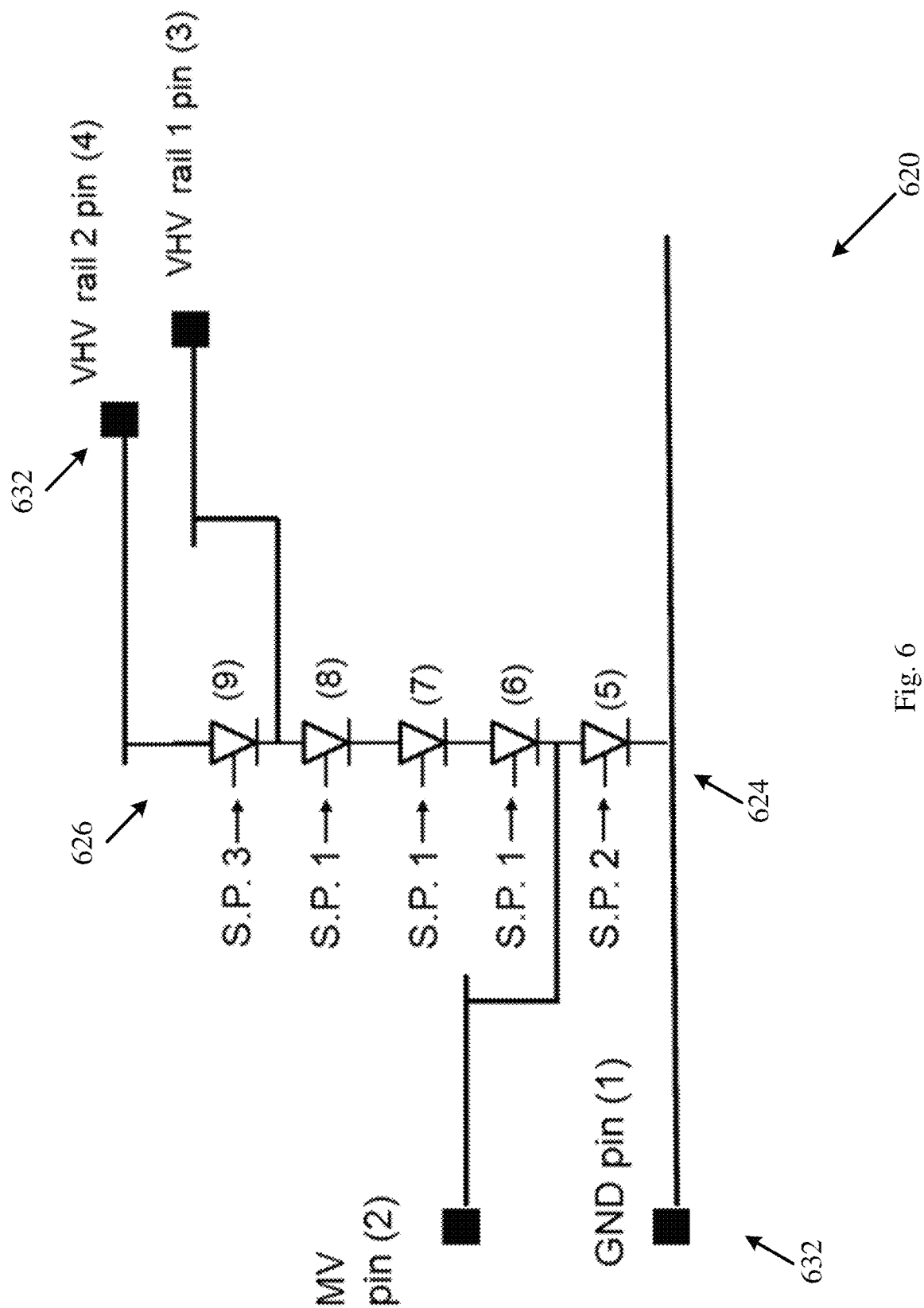
FIG. 6 is a schematic illustration of a multi voltage-domain ESD power clamp, in accordance with some demonstrative aspects.

Reference is made to FIG. 6, which schematically illustrates a multi voltage-domain ESD power clamp 620, in accordance with some demonstrative aspects. For example, multi voltage-domain ESD power clamp 120 (FIG. 1) may include one or more elements of multi voltage-domain ESD power clamp 620, and/or may perform one or more operations and/or functionalities of multi voltage-domain ESD power clamp 620.

In some demonstrative aspects, as shown in FIG. 6, multi voltage-domain ESD power clamp 620 may include a plurality of pins 632, denoted (1), (2), (3) and (4).

In some demonstrative aspects, as shown in FIG. 6, multi voltage-domain ESD power clamp 620 may include an ESD array 624 including a cascaded plurality of ESD power clamps 626, e.g., as described below.

In some demonstrative aspects, as shown in FIG. 6, multi voltage-domain ESD power clamp 620 may include a compact cascaded chain of ESD devices configured for ESD protection between various pin pairs of the plurality of pins 632, e.g., in a multi voltage-domains circuit.

In some demonstrative aspects, as shown in FIG. 6, the cascaded plurality of ESD power clamps 626 may include one or more first ESD power clamps, denoted (6), (7), (8), having a first setting, denoted S.P.1, of a scaling parameter.

In some demonstrative aspects, as shown in FIG. 6, the cascaded plurality of ESD power clamps 626 may include one or more second ESD power clamps, denoted (5), having a second setting, denoted (S.P.2), of the scaling parameter, e.g., different from the first setting of the scaling parameter.

In some demonstrative aspects, as shown in FIG. 6, the cascaded plurality of ESD power clamps 626 may include one or more third ESD power clamps, denoted (9), having a third setting, denoted (S.P.3), of the scaling parameter, e.g., different from the first and second settings of the scaling parameter.

In some demonstrative aspects, the first, second and/or third different scaling parameter settings may be implemented to provide a technical solution to clamp multiple voltage ranges between various pin pairs, for example, even without being constrained by a same scaling parameter setting.

In some demonstrative aspects, the first setting of the scaling parameter may be configured with respect to a maximum breakdown voltage Vbd and/or a maximum triggering voltage Vt1. For example, the first setting of the scaling parameter for the one or more first ESD power clamps may be configured, for example, to support a reduced number of ESD devices in the chain of ESD power clamps 626.

In some demonstrative aspects, the second setting and/or the third setting of the scaling parameter may be configured to support clamping between pairs of pins having a variety of voltage differences, for example, in a flexible manner.

In some demonstrative aspects, the second setting and/or the third setting of the scaling parameter may be configured to support selecting different values of the scaling parameter, for example, to match voltage levels that should be protected.

Accordingly, the scaling parameter settings of ESD device (5) and/or ESD device (9) may be set to the values (S.P.2) and (S.P.3), respectively, for example, to match voltage levels that should be protected. For example, these voltages may not necessarily be supported with respect to the value (S.P.1).

In some demonstrative aspects, the configuration of ESD array 624 with ESD devices having different scaling parameter settings may be implemented to provide a technical solution to share different portions corresponding to different voltage ranges, e.g., as described below.

In some demonstrative aspects, as shown in FIG. 6, a first portion of ESD array 624 including ESD device (9) may be configured to provide ESD power clamping between a higher VHV pin, denoted (4), and a lower VHV pin, denoted (3).

In some demonstrative aspects, as shown in FIG. 6, a second portion of ESD array 624 including ESD device (5) may be configured to provide ESD power clamping between an MV supply pin, denoted (2), and a Ground pin, denoted (1).

In some demonstrative aspects, as shown in FIG. 6, a third portion of ESD array 624, e.g., including ESD devices (5), (6), (7), (8), and (9), may be configured to provide ESD power between the highest VHV pin (4) and the GND pin (1).

In some demonstrative aspects, as shown in FIG. 6, a fourth portion of ESD array 624, e.g., including ESD devices (5), (6), (7), and (8), may be configured to provide ESD power clamping between the lower VHV pin (3), and the GND pin (1).

In some demonstrative aspects, the different portions of ESD array 624 may be configured to support a plurality of different voltage differences, for example, although the first and second portions may have lower voltage ranges, e.g., compared to a portion including the cascade of the ESD power clamps (6), (7), and (8).

In some demonstrative aspects, a breakdown voltage of a portion of ESD array 624 may be based on a sum of triggering voltage values of cascaded ESD devices in this portion of ESD array 624.

In some demonstrative aspects, a triggering voltage of the portion of ESD array 624 may be based on a sum of triggering voltage values of cascaded ESD devices in this portion.

In some demonstrative aspects, an ESD array may include a negative-voltage ESD array portion, for example, to protect a negative-voltage domain and/or a negative voltage pin, e.g., as described below.

Figure 7:
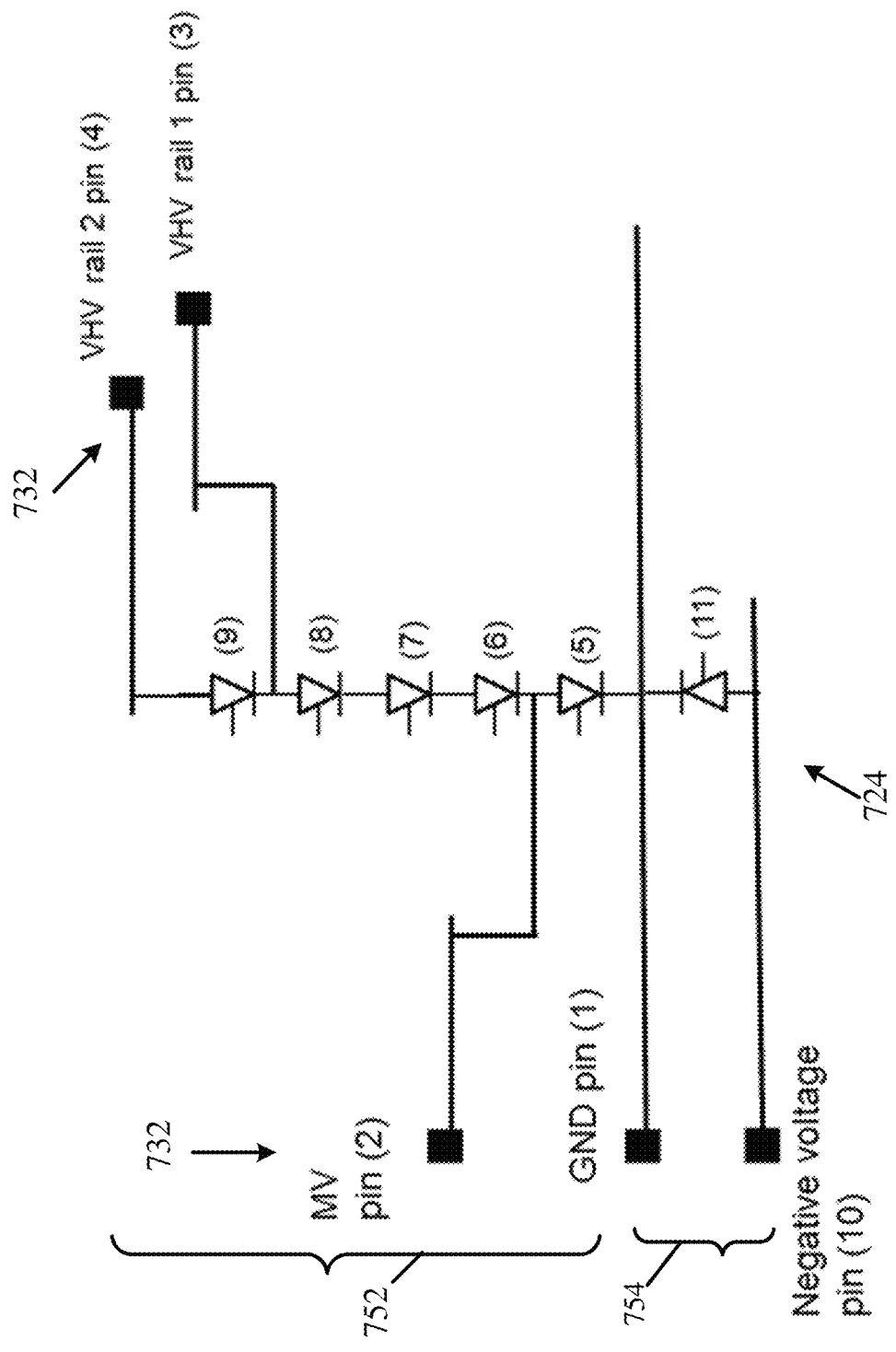
FIG. 7 is a schematic illustration of a multi voltage-domain ESD power clamp, in accordance with some demonstrative aspects.

Reference is made to FIG. 7, which schematically illustrates a multi voltage-domain ESD power clamp 720, in accordance with some demonstrative aspects. For example, multi voltage-domain ESD power clamp 120 (FIG. 1) may include one or more elements of multi voltage-domain ESD power clamp 720, and/or may perform one or more operations and/or functionalities of multi voltage-domain ESD power clamp 720.

In some demonstrative aspects, as shown in FIG. 7, multi voltage-domain ESD power clamp 720 may include a plurality of pins 732, denoted (1), (2), (3) and (4).

In some demonstrative aspects, as shown in FIG. 7, multi voltage-domain ESD power clamp 720 may include an ESD array 724 including a cascaded plurality of ESD power clamps, e.g., as described below.

In some demonstrative aspects, the cascaded plurality of ESD power clamps may include a cascaded plurality of MV SCR power clamps.

In other aspects, the cascaded plurality of ESD power clamps may include any other ESD devices.

In some demonstrative aspects, as shown in FIG. 7, multi voltage-domain ESD power clamp 720 may include a compact cascaded chain of ESD devices configured for ESD protection between various pin pairs of the plurality of pins 732, e.g., in a multi voltage-domain circuit.

In some demonstrative aspects, the ESD array 724 may include a negative-voltage ESD array portion 754 including an ESD device, denoted (11), for example, to protect a negative range of a negative-voltage domain or a negative voltage pin.

In some demonstrative aspects, negative-voltage ESD array portion 754 may be configured to provide ESD power clamping between a pin pair including a Ground pin, denoted (1), and a negative-voltage pin, denoted (10).

In some demonstrative aspects, the ESD array 724 may include a positive-voltage ESD array portion 752 including a cascade of ESD devices, denoted (5), (6), (7), (8), and (9), for example, to protect a positive-voltage range of a positive-voltage domain.

In some demonstrative aspects, positive-voltage ESD array portion 752 may be configured to provide ESD power clamping between a plurality of pin pairs from a plurality of pins, e.g., including the Ground pin (1), an MV pin, denoted (2), a lower VHV pin, denoted (3), and/or a highest VHV pin, denoted (4).

In some demonstrative aspects, as shown in FIG. 7, the cascade of ESD power clamps (5), (6), (7), (8), and (9) of the positive-voltage ESD array portion 752 may be connected in a first direction in the ESD array 724.

In some demonstrative aspects, as shown in FIG. 7, the ESD power clamp (11) of the negative voltage ESD array portion 754 may be connected in the ESD array 724 in a second direction opposite to the first direction. For example, the ESD power clamp (11) may have a reverse polarity compared to the polarity of ESD power clamps (5), (6), (7), (8), and (9).

In one example, the configuration of the negative portion 754 and the positive portion 752 in ESD array 724 may be based, for example, on a bidirectional behavior of the MV SCRs in ESD array 724.

In some demonstrative aspects, an ESD conductance mechanism of an SCR, e.g., each SCR, may be based, for example, on a snapback, e.g., in one direction, and through a built-in diode, e.g., in an opposite direction. Accordingly, two SCR devices connected 'face to face'. e.g., a cathode of a first SCR device connected to a cathode of a second SCR device, may provide a conductance mode, for example, by a snapback mode in the first SCR device, and the diode mode in the second SCR device, which is connected in series to the first SCR.

In some demonstrative aspects, a chain of SCR devices including a plurality SCR devices cascaded in a same direction, and one or more SCR devices connected in an opposite direction, may have a conductance, which may be based, for example, on a snapback mode in the plurality of SCR devices, and on a diode mode in the one or more SCR devices.

In some demonstrative aspects, the ESD array 724 may be configured to provide clamping between positive rails, e.g., positive VHV rails, as well as pairs of positive and negative pins, for example, while supporting sharing of portions of the ESD array 724, e.g., having SCR devices connected in opposite polarities.

In some demonstrative aspects, as shown in FIG. 7, the positive portion 752 including the cascade of SCR devices (5), (6), (7), (8), and (9) may be configured to provide clamping between various MV pins and various VHV pins, for example, by sharing portions of the positive portion 752.

In some demonstrative aspects, as shown in FIG. 7, the negative portion 754 including the SCR (11), which may be connected in a direction opposite to the direction of SCR devices (5), (6), (7), (8), and (9), may provide a technical solution to support clamping negative voltage ranges or negative voltage pins, for example, by the negative voltage pin (10), for example, while keeping a compactness and sharing concept of ESD array 724.

EXAMPLES

The following examples pertain to further aspects.

Example 1 includes an apparatus comprising a multi voltage-domain Electro Static Discharge (ESD) power clamp comprising a plurality of pins; and an ESD array comprising a cascaded plurality of ESD power clamps, wherein the ESD array comprises a plurality of ESD array portions configured to protect a respective plurality of voltage domains from ESD, wherein the ESD array is configured to connect the plurality of ESD array portions between a respective plurality of pin pairs from the plurality of pins, wherein an ESD array portion corresponding to a voltage domain comprises one or more ESD power clamps of the cascaded plurality of ESD power clamps, the ESD array portion configured to protect a voltage range of the voltage domain.

Example 2 includes the subject matter of Example 1, and optionally, wherein the plurality of pins comprises a shared pin, which is shared by a first pin pair and a second pin pair of the plurality of pin pairs.

Example 3 includes the subject matter of Example 2, and optionally, wherein the shared pin comprises a Ground pin.

Example 4 includes the subject matter of any one of Examples 1-3, and optionally, wherein the plurality of pin pairs comprises a first pin pair and a second pin pair, the first pin pair comprising a first pin and a second pin of the plurality of pins, the second pin pair comprising a third pin and a fourth pin of the plurality of pins, wherein the first, second, third and fourth pins are separate pins of the plurality of pins.

Example 5 includes the subject matter of any one of Examples 1-4, and optionally, wherein the ESD array comprises at least one shared ESD power clamp, which is shared by a first ESD array portion and a second ESD array portion of the plurality of ESD array portions.

Example 6 includes the subject matter of any one of Examples 1-5, and optionally, wherein the ESD array comprises a first ESD array portion comprising one or more first ESD power clamps of the cascaded plurality of ESD power clamps, and a second ESD array portion comprising one or more second ESD power clamps of the cascaded plurality of ESD power clamps, wherein each of the one or more second ESD power clamps is not included in the one or more first ESD power clamps.

Example 7 includes the subject matter of any one of Examples 1-6, and optionally, wherein the ESD array comprises a first ESD array portion comprising one or more first ESD power clamps, and a second ESD array portion comprising the one or more first ESD power clamps of the first ESD array portion and one or more second ESD power clamps, which are not in the first ESD array portion.

Example 8 includes the subject matter of any one of Examples 1-7, and optionally, wherein the ESD array comprises a first ESD array portion configured to protect a first voltage domain and a second ESD array portion configured to protect a second voltage domain, wherein the first ESD array portion is different from the second ESD array portion, wherein a voltage range of the first voltage domain is different from a voltage range of the second voltage domain.

Example 9 includes the subject matter of any one of Examples 1-8, and optionally, wherein the ESD array is configured to connect a first ESD array portion between pins of a first pin pair to protect a first voltage domain from ESD, and to connect a second ESD array portion between pins of a second pin pair to protect a second voltage domain from ESD.

Example 10 includes the subject matter of any one of Example 9, and optionally, wherein the first voltage domain has a first voltage range, the second voltage domain has a second voltage range wider than the first voltage range, wherein the first ESD array portion comprises a first count of ESD power clamps, the second ESD array portion comprises a second count of ESD power clamps, wherein the second count of ESD power clamps is greater than the first count ESD power clamps.

Example 11 includes the subject matter of Example 10, and optionally, wherein the first voltage domain comprises a Middle Voltage (MV) domain or a Low Voltage (LV) domain, and the second voltage domain comprises a Very High Voltage (VHV) domain.

Example 12 includes the subject matter of Example 10, and optionally, wherein the first voltage domain comprises a first Very High Voltage (VHV) domain having the first voltage range, the second voltage domain comprises a second VHV domain having the second voltage range.

Example 13 includes the subject matter of any one of Examples 1-12, and optionally, wherein the cascaded plurality of ESD power clamps comprises a plurality of identical ESD power clamps.

Example 14 includes the subject matter of any one of Examples 1-13, and optionally, wherein the cascaded plurality of ESD power clamps comprises a plurality of ESD power clamps having a same setting of a scaling parameter.

Example 15 includes the subject matter of any one of Examples 1-12, and optionally, wherein the cascaded plurality of ESD power clamps comprises one or more first ESD power clamps having a first setting of a scaling parameter, and one or more second ESD power clamps having a second setting of the scaling parameter different from the second setting of the scaling parameter.

Example 16 includes the subject matter of Example 14 or 15, and optionally, wherein the scaling parameter comprises a setting of one or more physical dimensions of the one or more ESD power clamps.

Example 17 includes the subject matter of any one of Examples 1-16, and optionally, wherein the ESD array comprises a negative-voltage ESD array portion to protect a negative-voltage domain, wherein the ESD array is configured to connect the negative-voltage ESD array portion between a pin pair comprising a Ground pin and a negative-voltage pin.

Example 18 includes the subject matter of any one of Examples 1-17, and optionally, wherein the ESD array comprises a positive-voltage ESD array portion and a negative-voltage ESD array portion, the positive-voltage ESD array portion configured to protect a positive-voltage range of a positive-voltage domain, the negative-voltage ESD array portion configured to protect a negative-voltage range of a negative-voltage domain, wherein the positive-voltage ESD array portion comprises one or more first ESD power clamps connected in a first direction in the cascaded plurality of ESD power clamps, wherein the negative-voltage ESD array portion comprises one or more second ESD power clamps connected in a second direction in the cascaded plurality of ESD power clamps, the first direction is opposite to the second direction.

Example 19 includes the subject matter of any one of Examples 1-18, and optionally, comprising an electronic device, the electronic device comprising a plurality of voltage rails corresponding to the plurality of voltage domains, the plurality of voltage rails connected to the plurality of pin pairs; and a plurality of electronic components connected to the plurality of voltage rails.

Example 20 includes an electronic device comprising a multi voltage-domain Electro Static Discharge (ESD) power clamp comprising a plurality of pins; and an ESD array comprising a cascaded plurality of ESD power clamps, wherein the ESD array comprises a plurality of ESD array portions configured to protect a respective plurality of voltage domains from ESD, wherein the ESD array is configured to connect the plurality of ESD array portions between a respective plurality of pin pairs from the plurality of pins, wherein an ESD array portion corresponding to a voltage domain comprises one or more ESD power clamps of the cascaded plurality of ESD power clamps, the ESD array portion configured to protect a voltage range of the voltage domain; a plurality of voltage rails corresponding to the plurality of voltage domains, the plurality of voltage rails connected to the plurality of pin pairs; and a plurality of electronic components connected to the plurality of voltage rails.

Example 21 includes the electronic device of Example 20, and optionally, including the apparatus of any one of Examples 1-19.

Example 22 includes an apparatus comprising means for executing any of the described operations of any of Examples 1-21.

Example 23 includes circuitry configured to perform any of the described operations of any of Examples 1-21.

Example 24 includes a method including any of the described operations of any of Examples 1-21.

Functions, operations, components and/or features described herein with reference to one or more aspects, may be combined with, or may be utilized in combination with, one or more other functions, operations, components and/or features described herein with reference to one or more other aspects, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. An apparatus comprising:
a multi voltage-domain Electro Static Discharge (ESD) power clamp comprising:
a plurality of pins; and
an ESD array comprising a cascaded plurality of ESD power clamps, wherein the ESD array comprises a plurality of ESD array portions configured to protect a respective plurality of voltage domains from ESD, wherein the ESD array is configured to connect the plurality of ESD array portions between a respective plurality of pin pairs from the plurality of pins, wherein an ESD array portion corresponding to a voltage domain comprises one or more ESD power clamps of the cascaded plurality of ESD power clamps, the ESD array portion configured to protect a voltage range of the voltage domain.

2. The apparatus of claim 1, wherein the plurality of pins comprises a shared pin, which is shared by a first pin pair and a second pin pair of the plurality of pin pairs.

3. The apparatus of claim 2, wherein the shared pin comprises a Ground pin.

4. The apparatus of claim 1, wherein the plurality of pin pairs comprises a first pin pair and a second pin pair, the first pin pair comprising a first pin and a second pin of the plurality of pins, the second pin pair comprising a third pin and a fourth pin of the plurality of pins, wherein the first, second, third and fourth pins are separate pins of the plurality of pins.

5. The apparatus of claim 1, wherein the ESD array comprises at least one shared ESD power clamp, which is shared by a first ESD array portion and a second ESD array portion of the plurality of ESD array portions.

6. The apparatus of claim 1, wherein the ESD array comprises a first ESD array portion comprising one or more first ESD power clamps of the cascaded plurality of ESD power clamps, and a second ESD array portion comprising one or more second ESD power clamps of the cascaded plurality of ESD power clamps, wherein each of the one or more second ESD power clamps is not included in the one or more first ESD power clamps.

7. The apparatus of claim 1, wherein the ESD array comprises a first ESD array portion comprising one or more first ESD power clamps, and a second ESD array portion comprising the one or more first ESD power clamps of the first ESD array portion and one or more second ESD power clamps, which are not in the first ESD array portion.

8. The apparatus of claim 1, wherein the ESD array comprises a first ESD array portion configured to protect a first voltage domain and a second ESD array portion configured to protect a second voltage domain, wherein the first ESD array portion is different from the second ESD array portion, wherein a voltage range of the first voltage domain is different from a voltage range of the second voltage domain.

9. The apparatus of claim 1, wherein the ESD array is configured to connect a first ESD array portion between pins of a first pin pair to protect a first voltage domain from ESD, and to connect a second ESD array portion between pins of a second pin pair to protect a second voltage domain from ESD.

10. The apparatus of claim 9, wherein the first voltage domain has a first voltage range, the second voltage domain has a second voltage range wider than the first voltage range, wherein the first ESD array portion comprises a first count of ESD power clamps, the second ESD array portion comprises a second count of ESD power clamps, wherein the second count of ESD power clamps is greater than the first count ESD power clamps.

11. The apparatus of claim 10, wherein the first voltage domain comprises a Middle Voltage (MV) domain or a Low Voltage (LV) domain, and the second voltage domain comprises a Very High Voltage (VHV) domain.

12. The apparatus of claim 10, wherein the first voltage domain comprises a first Very High Voltage (VHV) domain having the first voltage range, the second voltage domain comprises a second VHV domain having the second voltage range.

13. The apparatus of claim 1, wherein the cascaded plurality of ESD power clamps comprises a plurality of identical ESD power clamps.

14. The apparatus of claim 1, wherein the cascaded plurality of ESD power clamps comprises a plurality of ESD power clamps having a same setting of a scaling parameter.

15. The apparatus of claim 14, wherein the scaling parameter comprises a setting of one or more physical dimensions of the one or more ESD power clamps.

16. The apparatus of claim 1, wherein the cascaded plurality of ESD power clamps comprises one or more first ESD power clamps having a first setting of a scaling parameter, and one or more second ESD power clamps having a second setting of the scaling parameter different from the first setting of the scaling parameter.

17. The apparatus of claim 1, wherein the ESD array comprises a negative-voltage ESD array portion to protect a negative-voltage domain, wherein the ESD array is configured to connect the negative-voltage ESD array portion between a pin pair comprising a Ground pin and a negative-voltage pin.

18. The apparatus of claim 1, wherein the ESD array comprises a positive-voltage ESD array portion and a negative-voltage ESD array portion, the positive-voltage ESD array portion configured to protect a positive-voltage range of a positive-voltage domain, the negative-voltage ESD array portion configured to protect a negative-voltage range of a negative-voltage domain, wherein the positive-voltage ESD array portion comprises one or more first ESD power clamps connected in a first direction in the cascaded plurality of ESD power clamps, wherein the negative-voltage ESD array portion comprises one or more second ESD power clamps connected in a second direction in the cascaded plurality of ESD power clamps, the first direction is opposite to the second direction.

19. An electronic device comprising:
  a multi voltage-domain Electro Static Discharge (ESD) power clamp comprising:
    a plurality of pins; and
    an ESD array comprising a cascaded plurality of ESD power clamps, wherein the ESD array comprises a plurality of ESD array portions configured to protect a respective plurality of voltage domains from ESD, wherein the ESD array is configured to connect the plurality of ESD array portions between a respective plurality of pin pairs from the plurality of pins, wherein an ESD array portion corresponding to a voltage domain comprises one or more ESD power clamps of the cascaded plurality of ESD power clamps, the ESD array portion configured to protect a voltage range of the voltage domain;
  a plurality of voltage rails corresponding to the plurality of voltage domains, the plurality of voltage rails connected to the plurality of pin pairs; and
  a plurality of electronic components connected to the plurality of voltage rails.

20. The electronic device of claim 19, wherein the ESD array comprises at least one shared ESD power clamp, which is shared by a first ESD array portion and a second ESD array portion of the plurality of ESD array portions.

21. The electronic device of claim 19, wherein the ESD array is configured to connect a first ESD array portion between pins of a first pin pair to protect a first voltage domain from ESD, and to connect a second ESD array portion between pins of a second pin pair to protect a second voltage domain from ESD.

* * * * *